Patented Jan. 22, 1952

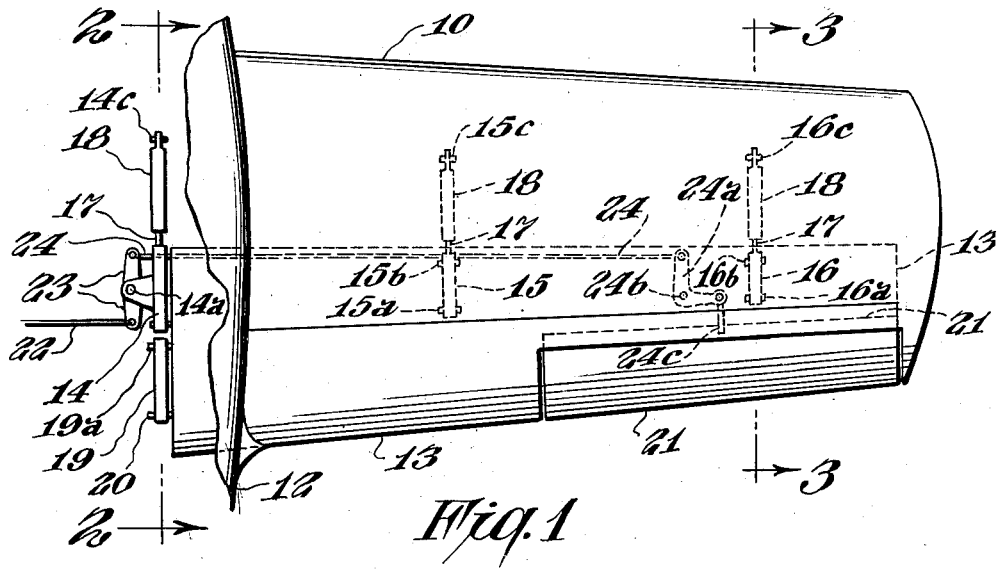
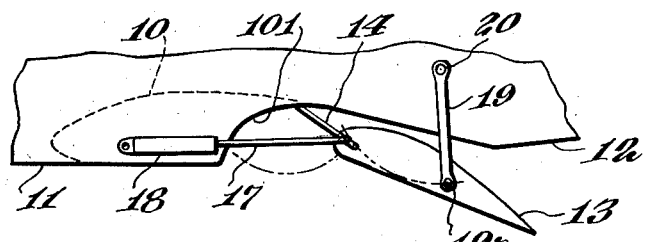
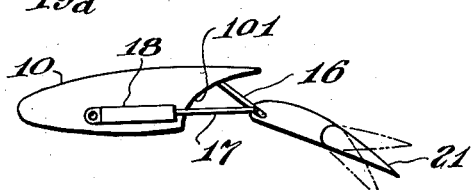
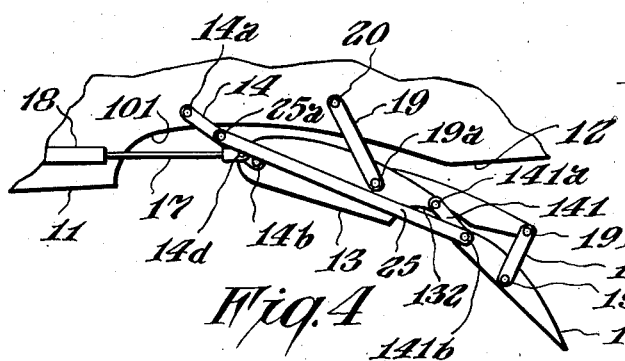
INVENTOR.
ROBERT TALBOT YOUNGMAN
BY
*Mowes, Holte, Crewe & Berry*
ATTORNEYS

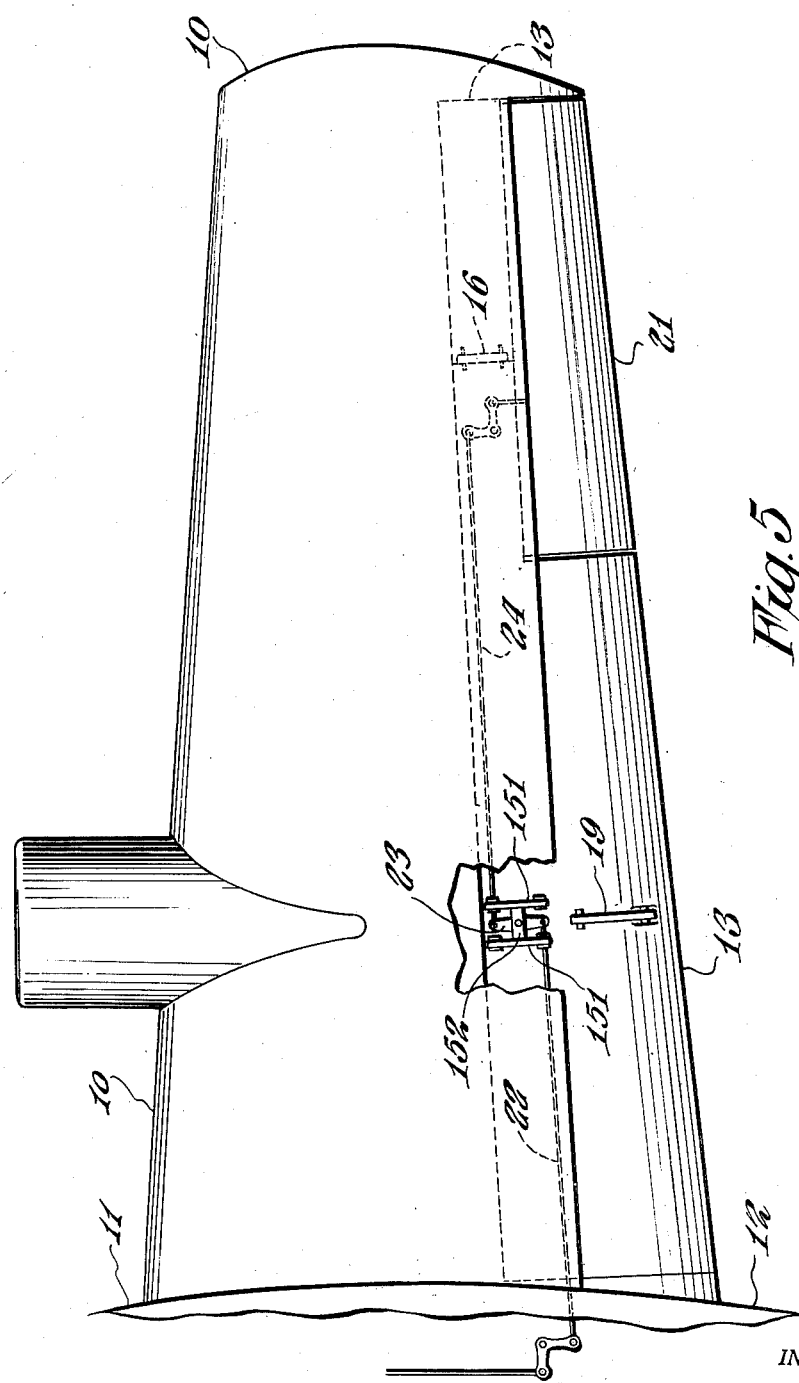

2,583,405

UNITED STATES PATENT OFFICE 2,583,405

FULL SPAN FLAP AND AILERON CONTROL

Robert Talbot Youngman, Longacres, Wooburn Green, England

Application October 22, 1946, Serial No. 704,910
In Great Britain September 6, 1944

Section 1, Public Law 690, August 8, 1946
Patent expires August 21, 1965

2 Claims. (Cl. 244—90)

The invention is concerned with aeroplanes having retractable aerofoil flaps extending throughout the whole or the greater part of the span of the wing, and its object is to provide normal aileron control means, capable of operating irrespective of the positional setting of the flaps.

In an aircraft according to the invention the retractable aerofoil flap carries a hinged rear portion which constitutes an aileron, the arrangement being such that movement of the aileron relative to the flap is permitted when the flap is retracted, and means are provided for operating the aileron in all positions of the flap.

Further according to the invention the movement of the aileron is effected through a lever-system operating so that the relative positions of the flap and the aileron mounted thereon are unaffected by the retractive or extending operations of the flap.

The nature of the invention and the manner in which it may be performed are hereinafter described with reference to the accompanying drawings, in which Fig. 1 is a plan of one-half of the wing of a single-engined low wing monoplane embodying the invention. Figs. 2 and 3 are diagrammatic sections taken on the lines II—II and III—III respectively of Fig. 1. Fig. 4 is a diagrammatic section depicting a modification, and Fig. 5 is a similar view to Fig. 1 illustrating the application of the invention to a multi-engined mid-wing aeroplane.

In the arrangement shown in Figs. 1 to 3 the reference numeral 10 denotes the wing proper and the line 11—12 the side of the fuselage. A single flap 13 extends from a point within the fuselage to the wing tip and is supported by parallel links 14, 15 and 16. These links are pivotally attached at their lower ends to the flap 13 along a common movable axis, and are pivotally connected at their upper ends to fixed frame members of the wing and fuselage along a common fixed axis. The upper and lower pivots of the link 14 are indicated at 14a and 14b in Fig. 4. The upper and lower pivots 15a and 15b of link 15 and the upper and lower pivots 16a and 16b of link 16 are indicated in Fig. 1. Rams 17 of a gang of hydraulic or other jacks 18 are pivotally connected to the links 14, 15 and 16 near the lower ends of the latter. The jack associated with the link 14 is mounted on the fuselage at a pivot 14c and those associated with the links 15 and 16 on the wing 10 at pivots 15c and 16c. The pivotal connection 14d of the link 14 with the associated jack is shown in Fig. 4. The other link and jack connections are similar. Additional links may be provided if desired. The jacks 18 operate in synchronism to move the flap 13 from the fully retracted position within the recess 101 to the extended position shown in Figs. 2 and 3.

The angular movements of the flap 13 during its extension and retraction are preferably controlled by a single torque link 19 which is pivotally connected at one end to the flap 13 at 19a, aft of the link 14 and at the other end to a pivot 20 on the fuselage. The concealment of the pivotal anchorages of the links within the body or the wing, rendered possible by this arrangement, provides an aero-dynamically clean wing adapted for high speed flight when the flap is retracted.

The trailing edge of the flap 13 carries at its outboard end an aileron 21 and the after portion of the wing 10 in the neighborhood of the aileron is cut away to provide space for the operational movement of the latter. The aileron movements may be effected through the medium of hydraulic, electrical or other powered mechanism, or through a direct mechanical coupling to the control column as in the case illustrated in the drawings. Here it will be seen that the rod or cable 22 leading from the control column (not shown) is attached to one end of a lever 23 which is pivoted at an intermediate point 14e on the inboard flap supporting link 14. The other end of said lever 23 is connected to a rod or cable 24 which passes through the flap 13 to one arm of a bell crank lever 24a which is pivoted at 24b on the flap 13. The other arm of the bell crank lever 24a is connected through a link 24c to the aileron 21. The lever 23 is mounted on said link 14 in such manner that its angular movement takes place in the plane defined by the pivotal axes of the links 14, 15 and 16, so that when said lever 23 is centralized its attachments to the rods or cables 22 and 24 coincide with said axes respectively, and the same angular setting of the aileron 21 in relation to the flap 13 is maintained in all positions of the flap. The attachments of the lever 23 to the elements 22 and 24 are so constructed as to permit three-dimensional movement, and the pivotal bearings of the link 14 may be made hollow to accommodate the control rod or cable 24 passed through the same.

In the modified arrangement illustrated in Fig. 4, the flap 13 is duplicated over the whole or part of that portion thereof which is not occupied by the aileron 21. Thus, an auxiliary flap 131 is mounted on the main flap 13 by means of links 141 and 191 in a manner similar to that of mounting the latter on the wing 10. The link 141 is pivotally connected to the flap 13 and the auxiliary flap 131, respectively, at 141a and 141b. The link 191 is pivotally connected to the flap 13 and the auxiliary flap 131, respectively, at 191a and 191b. The auxiliary flap 131 is operated, for example, by a link 25 connecting it mechanically to the link 14, so that when the main flap 13 is extended the auxiliary flap 131 is likewise extended from its housing recess 132 to the position shown in Fig. 4. The link 25 is pivotally connected to link 14 at 25a and to auxiliary flap 131 at 141b.

In the application of the invention to a multi-engined mid-wing type of aeroplane, as exemplified in Fig. 5, it may be impracticable to mount the inboard flap-supporting links in the fuselage. In such a case the aileron-control rod or cable 22 may be passed through the interior of the wing as shown, to be connected to a lever 23 mounted on the intermediate link 15 from which the aileron-control movements may be transmitted to the aileron in a manner similar to that already described with reference to the arrangement shown in Figs. 1 to 3. In the embodiment illustrated in Fig. 5, the link 15 is duplicated and the lever 23 is carried by a cross-member 152 connecting the two members 151 which collectively constitute the link. In this case also, the torque link 19 is preferably arranged in tandem with the link 15.

Although the foregoing description is confined to a single flap extending continuously from fuselage to wing-tip, it will be understood that circumstances may require the sub-division of the flap into two or more component sections, e. g. where the outer panels of a wing have a different angular setting from the inboard panels. In such cases those sections of the flaps which are not in the way of the ailerons may be set at greater angles for the purpose of giving increased lift when extended.

In a further embodiment of the invention (not illustrated in the drawings), in which the wing tip chord is insufficient to accommodate a full span flap, a normal wing-tip aileron may be used, in conjunction with the aileron-cum-flap arrangement hereinbefore described, an extension of the aileron control system being provided for the wing-tip aileron. If desired, means may be provided whereby the aileron-control mechanism may be disengaged from the flap aileron for manœuvring at high speeds, the flap ailerons being brought into use only when the flap is extended.

I have described what I believe to be the best embodiments of my invention. I do not wish, however, to be confined to the embodiments shown, but what I desire to cover by Letters Patent is set forth in the appended claims.

I claim:

1. In combination, an aircraft wing, a flap extending along at least a substantial part of the wing span, a plurality of parallel links connecting said flap to said wing, each link having a pivotal connection near one end with said wing along a fixed axis and a pivotal connection near the other end with said flap along a movable axis, a cooperating torque link pivotally mounted at one end upon a separate fixed axis and pivotally connected at the opposite end to the flap at a point substantially removed from said movable axis, the torque link and the parallel links combining to cause bodily retraction or extending movement of said flap with respect to the wing to be effected in response to angular movement of said parallel links, an aileron hinged to the rear portion of said flap, and means for uniformly operating said aileron angularly with respect to said flap in all operative positions of said flap with respect to said wing, including a lever mounted on one of said links and supported for pivotal movement in the plane defined by the pivotal axes of the links, a lever operating member connected to the lever substantially in line with the fixed axis, and a lever operated member connected to the lever substantially in line with the movable axis.

2. The combination as described in claim 1, in which said lever is carried by one of said parallel links within said wing, and the lever operating member is arranged to pass through a portion of said wing.

ROBERT TALBOT YOUNGMAN.

REFERENCES CITED

The following references are of record in the file of this patent:

UNITED STATES PATENTS

| Number | Name | Date |
|---|---|---|
| 2,236,838 | Robert | Apr. 1, 1941 |
| 2,243,885 | Schweisch | June 3, 1941 |
| 2,254,304 | Miller | Sept. 2, 1941 |
| 2,271,763 | Fowler | Feb. 3, 1942 |
| 2,276,688 | Dewoitine | Mar. 17, 1942 |
| 2,282,647 | Dillon | May 12, 1942 |
| 2,406,073 | Griswold | Aug. 20, 1946 |
| 2,406,923 | Stalker | Sept. 3, 1946 |